Aug. 29, 1967  J. D. CAMP ETAL  3,338,113

CONNECTING ROD CONSTRUCTION

Filed Dec. 1, 1965

INVENTORS
John D. Camp, &
BY Hulki Aldikacti

Robert J. Outland
ATTORNEY

United States Patent Office 3,338,113
Patented Aug. 29, 1967

3,338,113
CONNECTING ROD CONSTRUCTION
John D. Camp, Rochester, and Hulki Aldikacti, Orchard Lake, Mich., assignors to General Motors Corporation, Detroit, Mich., a corporation of Delaware
Filed Dec. 1, 1965, Ser. No. 510,875
5 Claims. (Cl. 74—579)

ABSTRACT OF THE DISCLOSURE

A connecting rod for use between reciprocating and rotating members of high speed machinery and constructed to resist increased bending loads and deformation of the crankpin bore caused by high rotational speeds. The structure includes longitudinal load bearing members tied together adjacent the crankpin bore by crossed diagonal ribs to form a truss-like structure which resists bending at the rotating rod end. The main portion of the rod is made of aluminum or other light metal to reduce bending forces and a bearing cap of steel or other high-strength material is used to resist deformation of the crankpin bore and move the center of gravity of the rod toward the crankpin.

---

This invention relates to connecting rod construction and, more particularly, to the construction of a connecting rod for use between reciprocating and rotating members of relatively high speed machinery such as certain internal combustion engines and compressors.

In the development of higher performance internal combustion engines as commonly used in automotive vehicles, the trend toward shorter stroke and higher rotational speeds is rapidly increasing the significance of the inertia loads acting upon the engine connecting rods as opposed to the gas loads caused by the transmission of power from the piston to the crankshaft. As rotational speeds increase, connecting rods are required to resist increased bending loads in addition to the column loads caused by the gas forces. Accordingly, the design of connecting rods for higher speed engines must take into account the increased bending loads.

The present invention provides a connecting rod construction having features which individually and collectively contribute to the ability of the rod to operate at higher rotational speeds without excessive bending deformations. For example, the bending strength of the rod is increased by incorporating in the construction diagonal ribs which tie together load bearing members of the rod adjacent the crankpin bore to form a truss-like structure which accepts bending loads in tension and compression thereby resulting in a smaller deformation of the rod. In order to reduce bending loads placed on the rod by its own weight, the main portion of the rod is made of a light metal such as aluminum or magnesium. Furthermore, resultant bending loads on the connecting rod are reduced by bringing the center of gravity closer to the crankpin bore which is accomplished by using, for the connecting rod cap, a material of greater density than the material of the main portion of the rod. For example, cast iron or steel can be used for the cap while aluminum or magnesium is used for the main portion of the connecting rod. Furthermore, the use of forged steel or cast iron for the cap stiffens the lower portion of the rod and reduces deformation of the crankpin bore which often becomes a problem in engines having high rotational speeds.

The total result, therefore, is a connecting rod which is lighter than the usual forged steel rod but is more resistant to deflection due to bending loads, limits bearing shell distortion at the crankpin end to a reasonable amount and further reduces deflections due to bending of the rod by use of a high modulus, high density material for the bearing cap.

These and other advantages of the present invention will be more thoroughly understood from the following description and drawings of an illustrative embodiment wherein.

Figure 1:
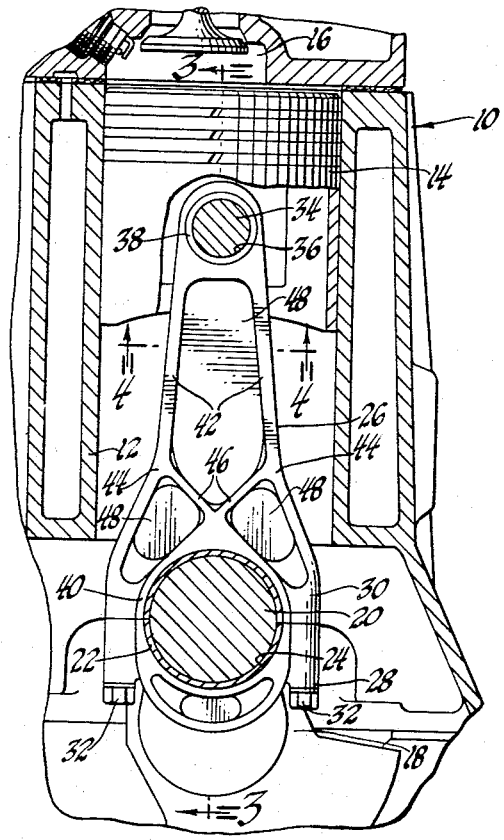
FIGURE 1 is a fragmentary transverse cross-sectional view of an internal combustion engine having a connecting rod according to the invention.
Figure 3:
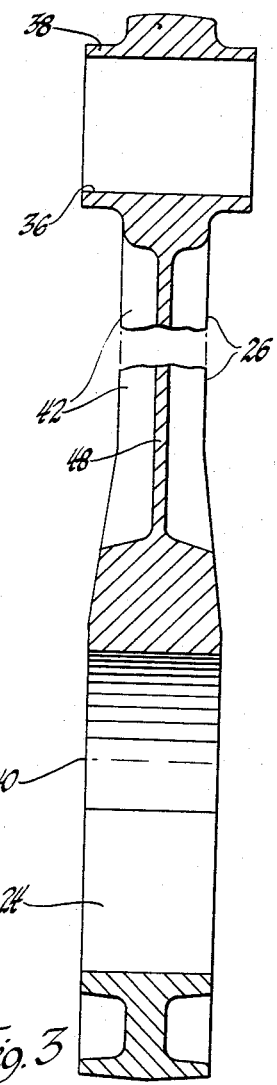
FIGURE 3 is a cross-sectional view of the connecting rod of FIGURE 1 taken along the plane generally indicated by the line 3—3 of the figure.
Figure 2:
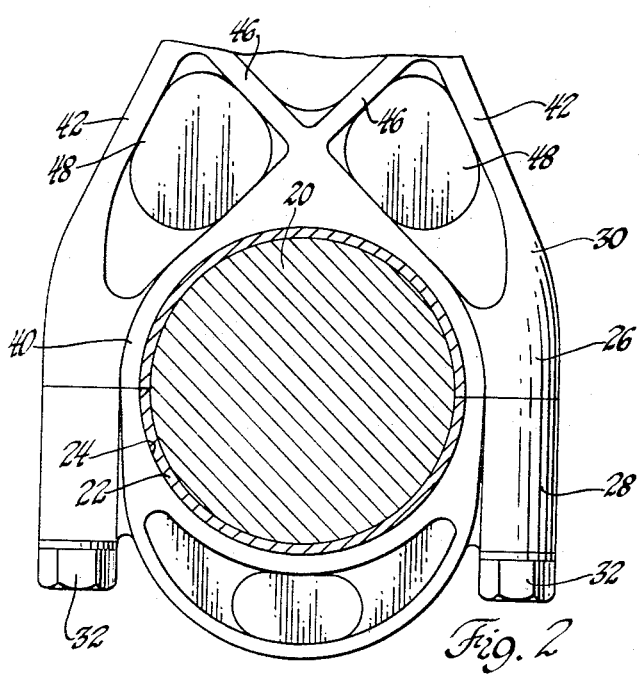
FIGURE 2 is an enlarged view of a portion of FIGURE 1 showing the crankpin end of the connecting rod.
Figure 4:
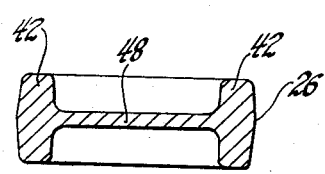
FIGURE 4 is a transverse cross-sectional view of the connecting rod of FIGURE 1 taken along the plane generally indicated by the line 4—4 of the figure.

Referring now to the drawing, numeral 10 generally indicates an internal combustion engine having a cylinder 12 and a piston 14 reciprocably disposed within the cylinder and forming one wall of a combustion chamber 16 located at one end of the cylinder. Adjacent the other end of the cylinder, the engine carries a crankshaft 18 having a crankpin 20 mounted for rotation in the plane of FIGURE 1. Rotatably secured on the crankpin are bearing means 22 which are releasably clamped within the crankpin bore 24 of a connecting rod 26 by a cap 28 which is retained on the main portion 30 of the rod by securing means such as bolts 32.

At its other end, the connecting rod is pivotally secured to the piston 14 by means of piston pin 34 which is carried in the piston and extends through a piston pin bore 36 formed within boss 38 at the end of the connecting rod.

The intermittent burning of fuel-air mixtures in the combustion chamber 16 of the engine creates gas pressure forces which act downwardly on the piston 14 and are transmitted to the crankshaft by the connecting rod 26. These forces are transmitted between the piston pin boss 38 and the crankpin boss 40 (comprising that part of main portion 30 and cap 28 surrounding crankpin bore 24) of the connecting rod primarily by means of compression and tension absorbing load bearing members 42.

The load bearing members 42 extend longitudinally between the outer diameters of bosses 38 and 40, and are bent slightly at 44 to permit the rod to clear the lower end of cylinder 12. A pair of diagonal ribs 46 extend from the bent portions 44 of load bearing members 42, diagonally crossing one another where they merge with boss 40 and extending onward to the intersection of the opposite compression member 42 with boss 40.

The diagonal ribs 46 combine with the load bearing members 42 to form a truss-like structure which converts bending loads on the connecting rods into tension and compression forces acting along the diagonal ribs and the load bearing members. Thus, bending loads on the connecting rod result in less deformation of the rod than would occur with conventional rod construction.

In order to provide for ease of forging or casting the connecting rod, thin webs 48 are provided closing the spaces between the various members of the truss-like structure. These webs are not intended to add substantially to the strength or stiffness of the connecting rod structure and, from a structural standpoint, could be dispensed with.

In order to reduce bending loads on the connecting rod, caused by the inertia effect of its own weight as the crankpin end 40 is moved in a circular path by the rotation of crankpin 20, the main portion 30 of the connecting rod is made of aluminum or some other suitable lightweight material. The cap 28, on the other hand, is preferably formed of forged steel or cast iron. This has the dual advantage of stiffening the rod structure at boss 40 so as to reduce distortions of crankpin bore 24 by the combination of inertia and gas forces acting dynamically thereupon, as well as moving the center of gravity of the connecting rod closer to the center of crankpin bore 24 than it would otherwise be located. The latter effect is caused by the higher density of the cap material and tends to reduce the total bending deflections of the connecting rod by balancing, to some extent, the forces acting between the crank and piston pins by increasing the forces acting on the cap below the crankpin.

The result of the foregoing construction is a connecting rod which is lighter while being more resistant to bending deflections than the usual forged steel rod. At the same time, bearing shell distortion is limited to a reasonable amount by the use of a high modulus material for the cap.

It should be understood that while the foregoing description is limited to a single illustrative embodiment, numerous changes or modifications could be made within the spirit and scope of the invention which is intended to be limited only by the language of the following claims.

We claim:

1. In a connecting rod for use between reciprocating and rotating members of high speed machinery,
   a first boss having a first bore therethrough and connectable to said reciprocating member,
   a second boss having a second bore therethrough and connectable to an eccentric portion of said rotating member, said second bore being spaced from and parallel to said first bore and said second boss being substantially larger than said first boss,
   a pair of compression and tension absorbing load bearing members extending longitudinally between outer edges of said first and second bosses, and
   a pair of crossed ribs diagonally connecting said load-bearing members adjacent said second boss to form with said load bearing members a truss-like structure whereby bending forces caused on the rod by circular motion of said second boss end are absorbed in tension and compression by said structure, thereby reducing deformation of the connecting rod.

2. In a connecting rod as defined in claim 1, said rod being formed at least partially of a lightweight material whereby bending forces on said connecting rod are reduced.

3. In a connecting rod as defined in claim 2, said second boss including a removable cap member forming a portion of said second bore and having a center of gravity spaced from the center of said second bore in a direction generally opposite from said first bore, said cap member being formed of higher density material than other portions of said rod whereby bending deformation of said connecting rod is reduced.

4. In a connecting rod as defined in claim 3, said bearing cap being formed of higher strength material than other portions of said connecting rod whereby distortion of said second bore due to dynamic forces is reduced.

5. In a connecting rod for use between reciprocating and rotating members of high speed machinery,
   a first boss having a first bore therethrough and connectable to said reciprocating member,
   a second boss having a second bore therethrough and connectable to an eccentric portion of said rotating member, said second bore being spaced from and parallel to said first bore and said second boss being substantially larger than said first boss,
   a pair of compression and tension absorbing load bearing members extending longitudinally between outer edges of said first and second bosses and
   a pair of crossed ribs diagonally connecting said load bearing members and said second boss, said ribs extending substantially tangential to said second bore and connecting with said load bearing members at points intermediate their ends but spaced more closely to said second boss than to said first boss, thereby forming a truss-like structure adjacent said second boss to absorb bending forces acting on the rod due to circular motion of said second boss.

References Cited

UNITED STATES PATENTS

| 1,819,784 | 8/1931 | McKone | 74—579 |
| 3,238,811 | 3/1966 | Longstreth | 74—579 |

FOREIGN PATENTS

| 464,724 | 4/1937 | Great Britain. |

FRED C. MATTERN, JR., *Primary Examiner.*